US011373180B2

(12) United States Patent
Cappelli et al.

(10) Patent No.: US 11,373,180 B2
(45) Date of Patent: *Jun. 28, 2022

(54) TRANSACTION SYSTEM AND METHOD

(71) Applicant: Diebold Nixdorf Incorporated, North Canton, OH (US)

(72) Inventors: Tom Cappelli, Fort Mill, SC (US); Roy Heilig, Littlestown, PA (US)

(73) Assignee: Diebold Nixdorf, Incorporated, Hudson, OH (US)

( * ) Notice: Subject to any disclaimer, the term of this patent is extended or adjusted under 35 U.S.C. 154(b) by 338 days.

This patent is subject to a terminal disclaimer.

(21) Appl. No.: 16/249,048

(22) Filed: Jan. 16, 2019

(65) Prior Publication Data
US 2019/0147442 A1 May 16, 2019

Related U.S. Application Data

(63) Continuation-in-part of application No. 15/909,544, filed on Mar. 1, 2018.

(60) Provisional application No. 62/465,472, filed on Mar. 1, 2017.

(51) Int. Cl.
*G06Q 20/40* (2012.01)
*G06Q 20/10* (2012.01)
*G07F 19/00* (2006.01)

(52) U.S. Cl.
CPC ............. *G06Q 20/40* (2013.01); *G06Q 20/10* (2013.01); *G06Q 20/1085* (2013.01); *G07F 19/211* (2013.01)

(58) Field of Classification Search
USPC ......................................................... 705/43
See application file for complete search history.

(56) References Cited

U.S. PATENT DOCUMENTS

| 8,020,757 B2 * | 9/2011 | Gardner ................. G06Q 20/40 235/379 |
| 8,112,330 B1 * | 2/2012 | Grandcolas ............ G06Q 20/32 705/35 |
| 2006/0026099 A1 * | 2/2006 | Danz ...................... G06Q 30/06 705/44 |

(Continued)

OTHER PUBLICATIONS

J Christopher Westland; Theordore H. Clark, "Secure Digital Payments," in Global Electronic Commerce: Theory and Case Studies, MIT Press, 1999, pp. 465-528. (Digital Payments). (Year: 1999).*

(Continued)

*Primary Examiner* — Chikaodinaka Ojiaku
(74) *Attorney, Agent, or Firm* — Black, McCuskey, Souers & Arbaugh, LPA

(57) ABSTRACT

A method, such as for executing electronic financial transactions, is disclosed herein. The method can include arranging an automated bank terminal and a bank core in communication with one another over a secured internal bank network. The method can also include receiving, at the automated bank terminal, a banking transaction request from a user wherein the banking transaction request is defined by a plurality of transaction details. The method can also include directing, with the automated bank terminal, the banking transaction request to a partner switch outside of the secured internal bank network in response to receiving the banking transaction request.

10 Claims, 11 Drawing Sheets

(56) References Cited

U.S. PATENT DOCUMENTS

| | | | | |
|---|---|---|---|---|
| 2008/0093441 A1* | 4/2008 | Taylor | G06Q 40/02 | 235/379 |
| 2008/0126245 A1* | 5/2008 | Rosenberg | G06Q 20/10 | 705/39 |
| 2009/0032579 A1* | 2/2009 | Gardner | G06Q 20/042 | 235/379 |
| 2009/0313129 A1* | 12/2009 | Rothschild | G06Q 20/40145 | 705/17 |
| 2012/0150708 A1* | 6/2012 | DeWanz | G06Q 20/4016 | 705/35 |
| 2014/0129439 A1* | 5/2014 | Suisa | G06Q 20/108 | 705/42 |
| 2014/0337221 A1* | 11/2014 | Hoyos | G06K 9/46 | 705/44 |
| 2015/0178697 A1* | 6/2015 | Rossmann | G07F 19/211 | 705/43 |
| 2016/0019510 A1* | 1/2016 | Guntupalli | G06Q 20/1085 | 705/43 |
| 2016/0321626 A1* | 11/2016 | Rossmann | G06Q 20/1085 | |

OTHER PUBLICATIONS

Office Action, dated Oct. 29, 2020, in related U.S. Appl. No. 15/909,544 (72 pages).
Author: International Searching Authority, Patent Cooperation Treaty; Title: Written Opinion of the International Searching Authority; dated May 8, 2018; All pages; International application No. PCTUS2018/020451 (corresponding to the present application).
Author: International Preliminary Examining Authority, Patent Cooperation Treaty; Title: International Preliminary Report on Patentability; dated Jul. 19, 2019; All pages; International application No. PCTUS2018/020451 (corresponding to the present application).
International Search Report issued in corresponding PCT application; 6 pages.

* cited by examiner

TRANSACTION SYSTEM AND METHOD

CROSS-REFERENCE TO RELATED APPLICATIONS

This application is a continuation of U.S. patent application Ser. No. 15/909,544, filed Mar. 1, 2018, which is hereby incorporated in its entirety. This application also claims priority to and the benefit of U.S. Provisional Patent Application No. 62/465,472 filed Mar. 1, 2017, which is hereby incorporated by reference in its entirety.

BACKGROUND

1. Field

The present disclosure relates to systems for executing electronic financial transactions.

2. Description of Related Prior Art

Recent technological advancements related to In-Lobby Teller (ILT) terminals have empowered consumers to interact with banking branches in new ways. While this opportunity enhances efficiency, it sometimes can be at the cost of consumer acquisition, engagement, and retention. Newer ILTs offer enhanced solutions. They combine the speed and accuracy of a self-service terminal with intelligence from a bank's core systems. For example, the Diebold Nixdorf 9900 ILT links to the staff within the bank to provide around-the-clock service for many types of transactions, provide a diverse range of services to individuals, and fulfill the needs of many small and medium businesses.

An ILT can have a flexible and modular design for enhanced functionality and can be designed to meet international accessibility guidelines. Some ILTs may have a nineteen inch color touchscreen consumer-viewable display with privacy filter and have both landscape and portrait display options as well as optional video enablement with Concierge Video Services™. Other options may be desirable such as having a cash capacity with a recycling module with up to five cassettes for denomination support and enhanced cash capacity, up to 10,800-note capacity for recycling, deposits of up to 11,500 notes in a five-cassette configuration, up to four cassettes to dispense or recycle (fifth cassette reserved for mix of deposit and reject/dispense retracts), and/or have a pocket-style user interface that accepts 200 notes at one time. Some units may have an optional Advanced Function Dispenser (AFD) the enables fast dispensing and holds an additional 13,000-note capacity and five denominations. ILT may be capable of advanced features such as a barcode reader and coin dispenser, an intelligent depository module for configuration flexibility, and capacity to accept stacks of up to 30 checks or bill payment documents in any insertion orientation.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method, such as for executing electronic financial transactions, can include arranging an automated bank terminal and a bank core in communication with one another over a secured internal bank network. The method can also include receiving, at the automated bank terminal, a banking transaction request from a user wherein the banking transaction request is defined by a plurality of transaction details. The method can also include directing, with the automated bank terminal, the banking transaction request to a partner switch outside of the secured internal bank network in response to receiving the banking transaction request.

According to other features, the method can also include arranging a switch and the bank core in communication with one another over the secured internal bank network. The method can also include receiving, with the switch, a force-post transaction defined by at least some of the plurality of transaction details and originating at the partner switch after the directing of the banking transaction to the partner switch. The receiving the force-post transaction can be further defined as receiving, with the switch, the force-post transaction over one of an electronic funds transfer (EFT) network and an automated clearing house (ACH) network distinct from the secured internal bank network. The method can also include converting, with the partner switch, the banking transaction request to the force-post transaction after the directing of the banking transaction to the partner switch and prior to the receiving the force-post transaction with the switch. The method can also include designating, with the automated bank terminal, the banking transaction request as an off-us transaction prior to the directing of the banking transaction request to the partner switch, wherein the designating is irresponsive to the plurality of transaction details and wherein the plurality of transaction details of the force-post transaction includes the off-us designation.

In other features, the method can also include converting, with the partner switch, the banking transaction request to a force-post transaction defined by at least some of the plurality of transaction details after the directing of the banking transaction to the partner switch. The method can also include directing, with the partner switch, the force-post transaction to the secured internal bank network after the converting. The method can also include tagging, with the automated bank terminal, the banking transaction request as an off-us transaction prior to the directing of the banking transaction request to the partner switch outside of the secured internal bank network in response to the receiving the banking transaction request, the tagging irresponsive to the plurality of transaction details. The directing of the banking transaction to the partner switch can be further defined as directing, with the automated bank terminal, the banking transaction request to the partner switch over one of an electronic funds transfer (EFT) network and an automated clearing house (ACH) network outside of the secured internal bank network.

According to additional features, the plurality of transaction details include at least one of the group including a transaction amount, one or more bank accounts, a personal identification number, a current image of user, an image of a driver's license, and a bank routing number. The method can also include directing, with the automated bank terminal, the banking transaction request over the secured internal bank network to a teller computing device before the directing the banking transaction request to the partner switch. The method can also include receiving, at the teller computing device, an approval input corresponding to approval of the banking transaction request before the directing the banking transaction request to the partner switch. The directing of the banking transaction request to the teller computing device can be further defined as directing, with the automated bank terminal, the banking transaction request over a secured internal bank network to a teller computing device including a tablet computer.

According to other features, the method can also include receiving, at a second automated bank terminal, a second banking transaction request from a second user wherein the second banking transaction request is defined by a second plurality of transaction details. The method can also include directing, with the second automated bank terminal, the second banking transaction request over the secured internal bank network to the tablet computer. The method can also include receiving, at the tablet computer, a second approval input corresponding to approval of the second banking transaction request. The method can also include directing, with the second automated bank terminal, the second banking transaction request to the partner switch. The method can also include accessing, with the teller computing device, the bank core over the secured internal bank network prior to the receiving the approval input. The method can also include executing, with the automated bank terminal, the banking transaction request substantially contemporaneously with the directing the banking transaction request to a partner switch outside of the secured internal bank network.

A method, such as for executing electronic financial transactions, can include receiving, at an automated bank terminal, a banking transaction request from a user wherein the banking transaction request is defined by a plurality of transaction details. The method can also include directing, with the automated bank terminal, the banking transaction request over a secured internal bank network to a teller computing device. The method can also include receiving, at the teller computing device, an approval input corresponding to approval of the banking transaction request. The method can also include directing, with one of the automated bank terminal and the teller computing device, the banking transaction request to a partner switch outside of the secured internal bank network in response to the receiving the approval input.

In other features, the method can also include arranging a switch and a bank core in communication with one another and with the teller computing device and the automated bank terminal over the secured internal bank network. The method can also include receiving, with the switch, a force-post transaction defined by at least some of the plurality of transaction details after the directing of the banking transaction to the partner switch. The method can also include directing, with the switch, the force-post transaction to the bank core over the secured internal bank network after the receiving of the force-post transaction from the partner switch. The method can also include directing, with the bank core, a confirmation message to the switch over the secured internal bank network after the directing of the force-post transaction to the bank core from the switch. The confirmation message can correspond to recordation of the force-post transaction in the bank core. The method can also include directing, with the switch, the confirmation message outside of the secured internal bank network.

According to additional features, the method can also include receiving, with the automated bank terminal, the confirmation message from outside of the secured internal bank network. The method can also include executing, with the automated bank terminal, the banking transaction request in response to the receiving the confirmation message from outside of the secured internal bank network.

A system, such as for executing electronic financial transactions, can include a bank core having one or more processors and configured maintain a primary ledger of a plurality of accounts and transactions associated with the plurality of accounts. The system can also include an automated bank terminal having one or more processors and configured to receive a banking transaction request from a user. The banking transaction request can be defined by a plurality of transaction details. The automated bank terminal can be configured to transmit the banking transaction request for eventual receipt by the bank core of the plurality of transaction details. The system can also include a secured internal bank network, wherein the bank core and the automated bank terminal directly input at least some communications to the secured internal bank network. The system can also include a partner switch having one or more processors and disposed outside of the secured internal bank network and in communication with the automated bank terminal and configured to receive the banking transaction request from the automated bank terminal and also configured to convert the banking transaction request to a force-post transaction defined by at least some of the plurality of transaction details.

According to other features, the system can also include a switch having one or more processors and configured to direct electronic communications relative to the secured internal bank network and also to receive and output electronic communications relative to one or more financial transaction networks external to the secured internal bank network. The switch can be further configured to receive the force-post transaction from the partner switch over the one or more financial transaction networks external to the secured internal bank network. The switch can be further configured to transmit the force-post transaction to the bank core over the secured internal bank network. The switch can be further configured to transmit a confirmation of the force-post transaction to the partner switch over the one or more financial transaction networks external to the secured internal bank network.

In other features, the system can also include a teller computing device having one or more processors and disposed to communicate with the switch and the automated bank terminal over the secured internal bank network. The teller computing device can be configured to receive the banking transaction request from the automated bank terminal over the secured internal bank network. The teller computing device can also be configured to receive an approval input corresponding to approval of the banking transaction request. The teller computing device can be configured to direct the approval input to the automated bank terminal.

BRIEF DESCRIPTION OF THE DRAWINGS

The detailed description set forth below references the following drawings.

DETAILED DESCRIPTION

Figure 1:
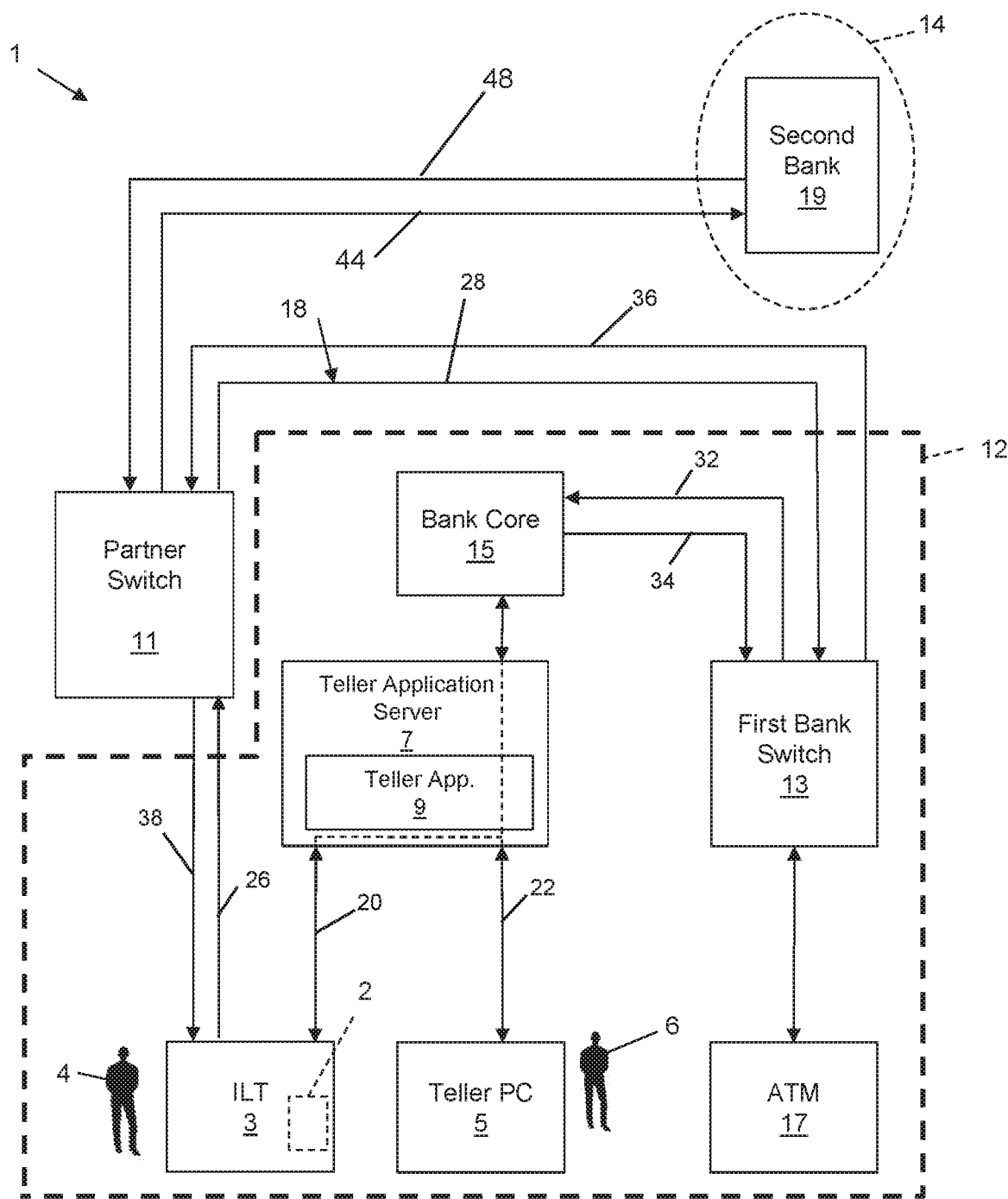
FIG. 1 is a schematic illustration of a system according to a first exemplary embodiment of the present disclosure.

The present disclosure, as demonstrated by the exemplary embodiment described below, can provide systems and methods for executing electronic financial transactions that improve the computing efficiencies of existing systems. Efficiency relates to the relationship between the accomplishment of a task and the resources required to accomplish the task. Improvements in efficiency are defined when the resources required to perform the task are reduced and also when relatively greater or additional tasks can be accomplished without supplementing resources or with minimal additions to resources.

The inventors have observed that the costs associated with improvements in banking technology often include variable costs and fixed costs. The inventors have further observed that variable costs are defined, by way of example and not limitation, by the cost of automated bank terminals such as ILTs and automated transaction machines (ATMs). The cost of automated bank terminals is variable, based on the number of terminals purchased and the extent of functionality of each automated bank terminal. The inventors have further observed that fixed costs are defined, by way of example and not limitation, by the cost of setting up new technology to function with existing, or "legacy" systems. Set-up can require extensive reprogramming and testing for validation.

The inventors have further observed that, for many banks, the extent of fixed costs can preclude the deployment of new technology. The present disclosure discloses improvements in the efficiency of banking systems. The present disclosure discloses new methods of operating components within a banking system that increases the functionality of the bank system. The present disclosure also discloses new methods of operating components outside of an internal banking system that increases the functionality of the bank system.

The present disclosure provides a method and system with the enhanced functionality associated with ILTs without requiring significant changes to existing bank computing system. Transactions are routed out of the internal bank network and directed back into the internal bank core. An automated bank terminal, such as an ILT, can receive a banking transaction request from a user. Prior to being routed out of the internal bank network, the banking transaction request can be tagged or designated as an off-us transaction by the automated bank terminal. The banking transaction request can be directed to a partner switch that is disposed outside of the internal bank network. The partner switch can convert the banking transaction request to a force-post transaction and then direct the force-post transaction back into the internal bank core. By so designating and converting the transaction, the existing bank computer network can accept and execute the transaction. Conversely, modifying an existing bank computer system to accept the same banking transaction request "directly" through the internal bank network (directly between an ILT and the bank core) would require setup costs of over one million dollars.

FIG. 1 illustrates one example embodiment of a banking system 1 of a first bank 18. The system 1 includes various components that communicate over a first bank network/computer system. The first bank network/computer system of the first bank 18 includes a secured internal bank network that is referenced schematically at 12. FIG. 1 shows several components arranged to communicate with one another over the exemplary secured internal bank network 12, including a local bank switch/first bank switch 13, a bank core 15, a bank teller personal computer (a teller terminal) 5, an automated transaction machine (ATM) 17, an ILT 3, and a teller application server 7 running a teller application 9. As shown in FIG. 1, the switch 13 directs communications between devices arranged on the secured internal bank network 12. As also shown in FIG. 1, the switch 13 is disposed to communicate with a partner switch 11 that is outside of the secured internal bank network 12. A second bank 19 includes second, secured internal bank network that is referenced at 14.

The ILT 3 includes one or more processors and a variety of different banking transaction requests may be input to the ILT or automated bank terminal 3 by a user 4. A banking transaction request is schematically illustrated and referenced at 2 in FIG. 1. For example, the user 4 may request a cash withdrawal (e.g., debit) from an account such as a checking account, a savings account, or another type of bank account. In some embodiments of the present disclosure, if the requested withdrawal exceeds a threshold value, such as $10,000, or another value, the transaction may first need teller approval, as will be discussed in greater detail below. Cash deposits (e.g., credits) may be accepted at the ILT 3 that may include cash, checks, or both. A deposit including a check may be an on-us or an off-us deposit. The system 1 of FIG. 1 may also be used to cash checks at the ILT 3 for on-us or off-us users with an on-us check. In some embodiments of the present disclosure, cashing an on-us check for an on-us user may involve verifying the identity of the user 4 with a banking card and a personal identification number (PIN). If the check is over a threshold limit value, the transaction may be teller assisted/approved through the teller application 9.

The teller terminal/teller PC 5 is in general a personal computer that may be a laptop, a desktop, or a tablet. Alternatively, the teller terminal 5 may be an iPad type of device, a handheld device, or another device that is capable of permitting a bank teller 6 to approve/override a banking transaction request 2 that a banking user 4 is attempting to enter and process at the ILT 3. In the example system 1, the teller terminal 5 may be at least partially under the control of the teller application 9 running on the teller application server 7. The teller computing device 5 has one or more processors and is disposed to communicate with the switch 13 and the ILT 3 over the secured internal bank network 12. The teller application 9 may detect banking request transactions 2 that are entered into the ILT 3 by a user 4 and that have exceeded a threshold value, such as a $5,000 limit for a cash withdrawal (e.g., debit), and then forward these transactions 2 to the teller terminal 5. The teller terminal 5 and the teller application 9 (e.g., teller software) provide screens/menus prompting and allowing the bank teller 6 the option of approving or rejecting a particular banking transaction request 2 exceeding the threshold limit. In some embodiments, the teller application 9 may provide audit support with reporting capability of transactions such as when a teller approves or disapproves of various transactions.

The first bank switch 13 and, in general, the partner switch 11 receives transaction requests/messages/data blocks/packets of data and determines where they should be routed in order to reach their intended destination(s). The switches 11 and 13 can be substantially similar in terms of structure and differentiated by programming. The off-site partner switch 11 can be a certified banking switch that has a verifiable reliability for routing electronic financial transactions. The first bank switch 13 may loosely operate similar to a telephone switch and route data blocks based on their destination address. Those of ordinary skill in the art will appreciate that over time lookup-tables of destination address may be matched with paths onto which they may be routed to reach those destinations. Existing, known switches will not transmit transaction requests/messages/data blocks/packets of data that re-enter the secured internal bank network 12 from which it originated. However, the switch 13 according to the present disclosure will transmit transaction requests/messages/data blocks/packets of data sent to the partner switch 11 from the ILT 3 and then routed back into the secured internal bank network 12 by the partner switch 11. For example, messages leaving the secured internal bank network 12 from the ILT 3 and received by the partner switch 11 are received back into the secured internal bank network 12 by the switch 13.

In some embodiments of the present disclosure, the teller application 9 is able to handle typical teller control functions such as signature card verification. An off-us user with an on-us item (e.g., check) may require authentication to be performed through an embodiment of the teller application 9 that compares signatures, an image of the user against the physical appearance of the user at the ILT 3, and/or other biometric data. In some embodiments of the present disclosure, the teller application 9 can detect false identifications. Rather than utilize a human teller for completing a relatively small loan application, the first bank 18 can direct at least some users to begin or completely fill out necessary forms electronically at the ILT 3 before subsequently involving a human teller.

In general, the bank core 15 includes central databases so that accurate account balances are maintained. These databases of various account information may reside within the bank core 15 on multiple servers and/or other computing devices. Thus, the bank core 15 can have one or more processors and be configured to maintain a primary ledger of a plurality of accounts and transactions associated with the plurality of accounts. As illustrated in FIG. 1, the exemplary bank core 15 communicates with the exemplary first switch 13 and the exemplary teller application server 7. The ILT 3 and the bank core 15 are in communication with one another over a secured internal bank network 12. The communication may or may not be direct. An automated bank terminal may communicate with the bank core through a server located at a branch and or through a switch positioned within the secured internal bank network. As shown in FIG. 1, the exemplary ILT 3 communicates with the exemplary bank core 15 through the exemplary teller application server 7.

In general, the ATM 17 is a traditional ATM where banking transactions may be conducted that generally have a lower threshold limit than the ILT 3. For example, cash withdrawals at the ATM 17 may not exceed $500.

Figure 2:
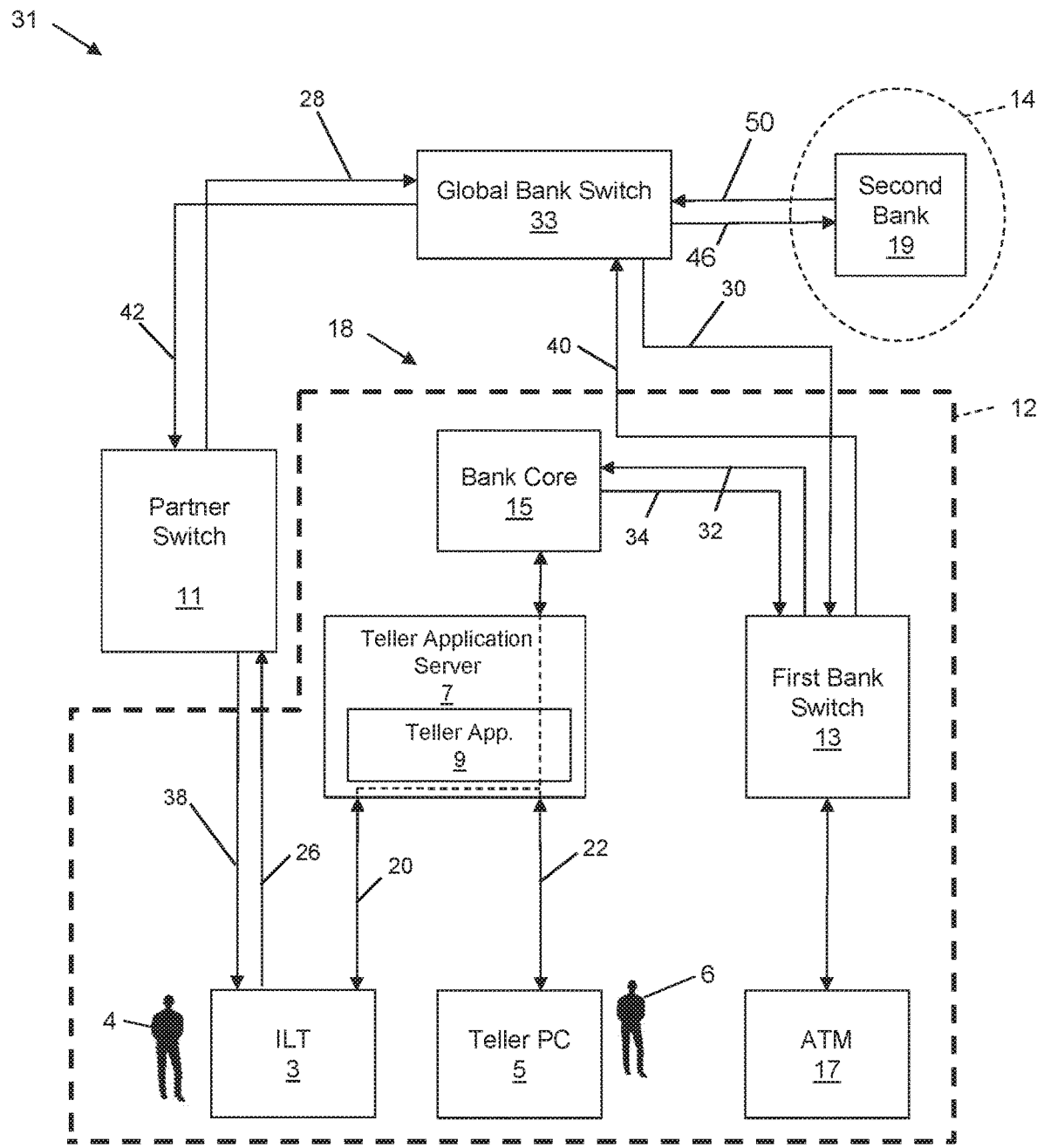
FIG. 2 is a schematic illustration of a system according to a second exemplary embodiment of the present disclosure.

FIG. 2 is an illustration of a banking system 31 similar to the banking system 1 shown in FIG. 1. FIG. 2 further illustrates a global bank switch 33 disposed between the switch 13 and the partner switch 11. FIGS. 1 and 2 thus confirm that communications between the switch 13 and the partner switch 11 can be direct or indirect in various applications of embodiments of the present disclosure.

Figure 3:
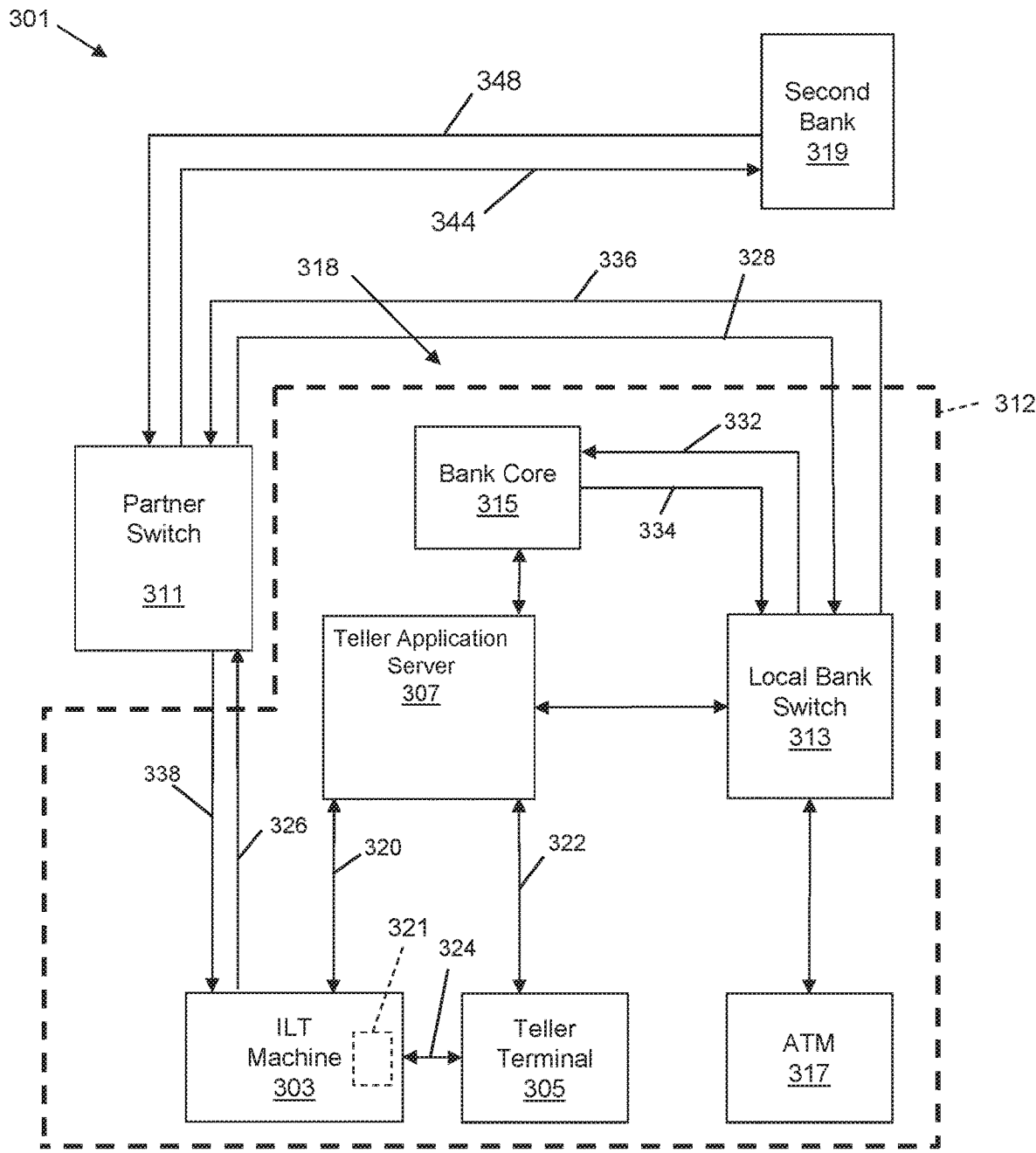
FIG. 3 is a schematic illustration of a system according to a third exemplary embodiment of the present disclosure.

FIG. 3 is an illustration of a banking system 301 in which a first bank 318 and a second bank 319 communicate. The first bank 318 includes a secured internal bank network 312. Various components communicate over the exemplary secured internal bank network 312, such as an ILT 303, a teller terminal 305, an ATM 317, a teller application server 307, a bank core 315, and a local bank switch 313. The system switch 313 is disposed to communicate with a partner switch 311. As shown in FIG. 3, the ILT 303 may further include a processor logic 321 (e.g., microprocessor as seen in FIG. 3) to assist in parsing messages/packets and in making decisions.

Figure 4:
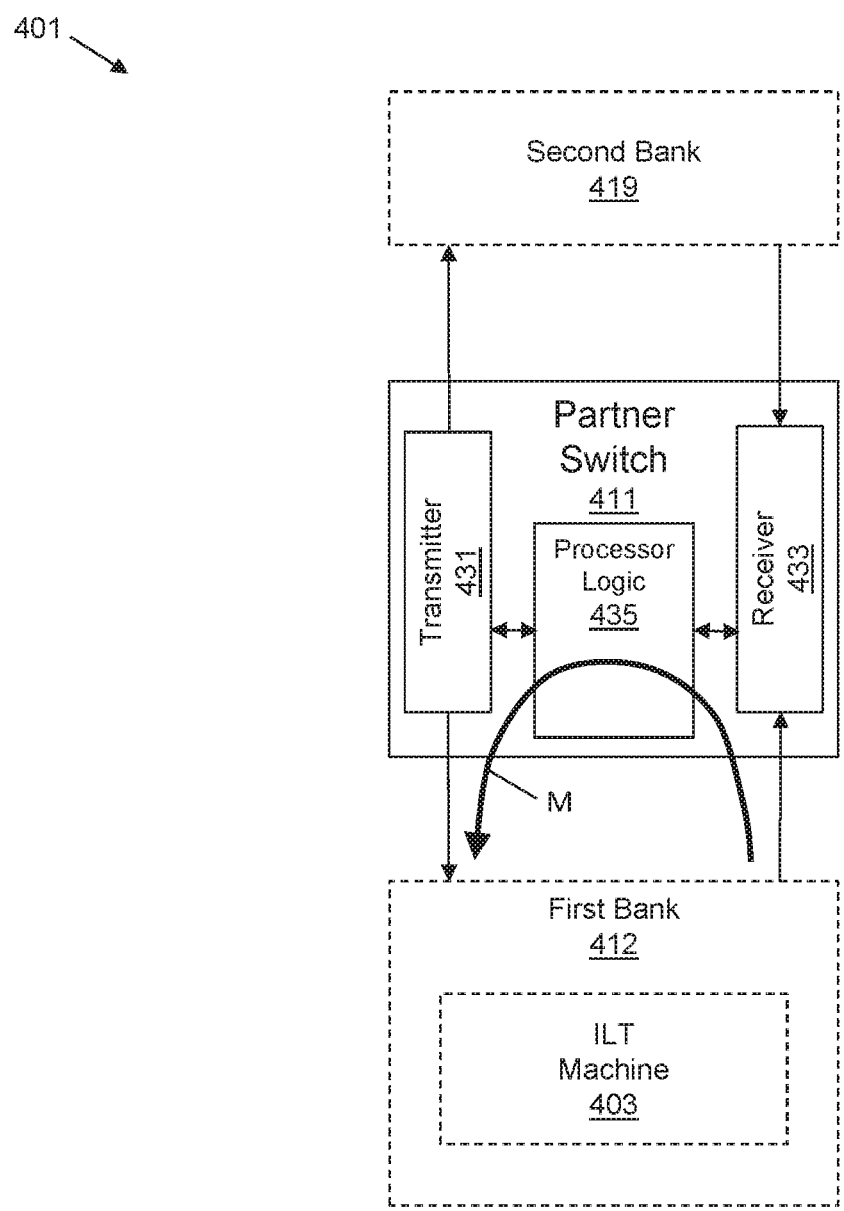
FIG. 4 illustrates a first example of a system for processing tagged off-us banking transactions using a partner switch having a processor logic.

FIG. 4 illustrates an example system 401 including a secured internal bank network 412. An ILT 403 is disposed in the secured internal bank network 412. A partner switch 411 is arranged to communicate with the secured internal bank network 412. The ILT 403 can communicate with a second bank 419 through the partner switch 411. The exemplary partner switch 411 has a transmitter 431, a receiver 433, and a processor or "processor logic" 435. The transmitter 431 and receiver 433 transmit and receive data such as packets of fixed size or variable size, as well as and other types of data. The processor logic 435 may run software instructions and is configured to analyze data information and to determine where received data should be routed. For example, the receiver 433 receives communications from the ILT 403 within the secured internal bank network 412 such as a banking transaction request that has been tagged as approved by a teller. The processor logic 435 determines whether to route the banking transaction request directly back to the secured internal bank network 412 or to the second bank 19. The banking transaction request may be fully processed by the first bank without the second bank 419 receiving the banking transaction request. In that case, the transmitter 431 will transmit the banking transaction request back to the secured internal bank network 412. As set forth elsewhere herein, the processor logic 435 can also be configured to convert the banking transaction request to a force-post transaction before directing the force-post transaction back to the secured internal bank network 412. In some configurations, the transmitter 431 transmits the ILT banking request back to a switch disposed in the secured internal bank network 412.

Figure 5:
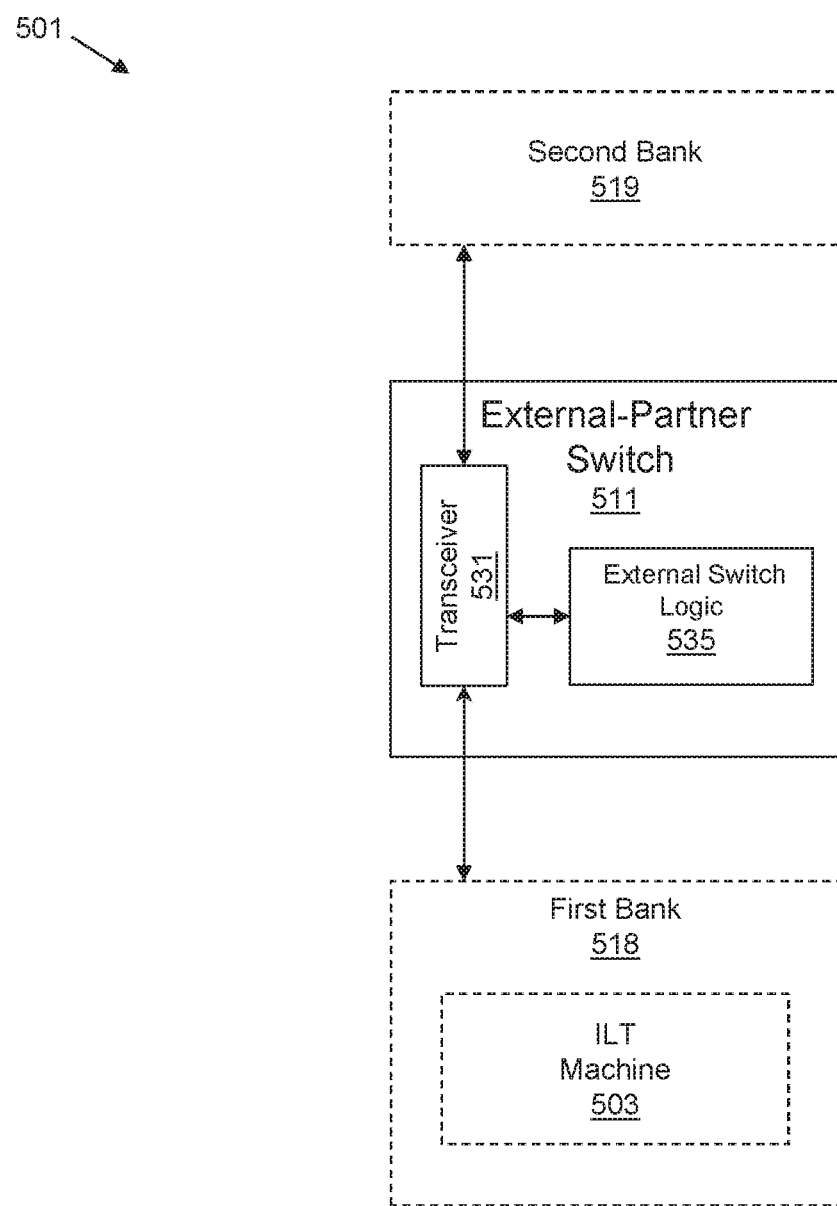
FIG. 5 illustrates a second example embodiment of a system for processing tagged off-us banking transactions using a partner switch having an external switch logic.

FIG. 5 illustrates an example system 501 including a secured internal bank network a first bank 518 having a secured internal bank network (represented by a box in dash line). An ILT 503 is disposed in the secured internal bank network. A partner switch 511 is arranged to communicate with the secured internal bank network. The ILT 503 can communicate with a second bank 519 through the partner switch 511. The external, partner switch 511 is configured to route off-us banking transactions back to the same bank that generated that banking transaction. The external-partner switch 511 includes a transceiver 531 and external switch logic 535. In operation, the transceiver 531 will receive an off-us banking transaction request from the first bank 518. The external switch logic 535 is configured to re-route the message based, at least in part, on an address in the message and the tag of the message as an off-us message. The external-partner switch 511 and the external switch logic 535 may be certified according to at least one quality standard for switches in financial networks. The external switch logic 535 sends the message back to the first bank 518, where the off-us banking transaction request will be executed by the first bank 18. The transceiver 531 transmits the message back to the first bank 18 where it may now be executed. It also noted that the switch logic 535 can convert the banking transaction request to a force-post transaction.

In other operating scenarios, the external switch logic 535 of the external-partner switch 511 can send the banking transaction request to the second bank 519 when the banking transaction is in fact off-us and associated with the second bank 519. For example, the second bank 519 may be requested to approve/confirm a signature on a check that is presented at the first bank 518 as part of the banking transaction request. The check may be associated with an account that is maintained by the first bank 518 while the user and his/her signature is associated with a banking account maintained by the second bank 519.

Figure 6:
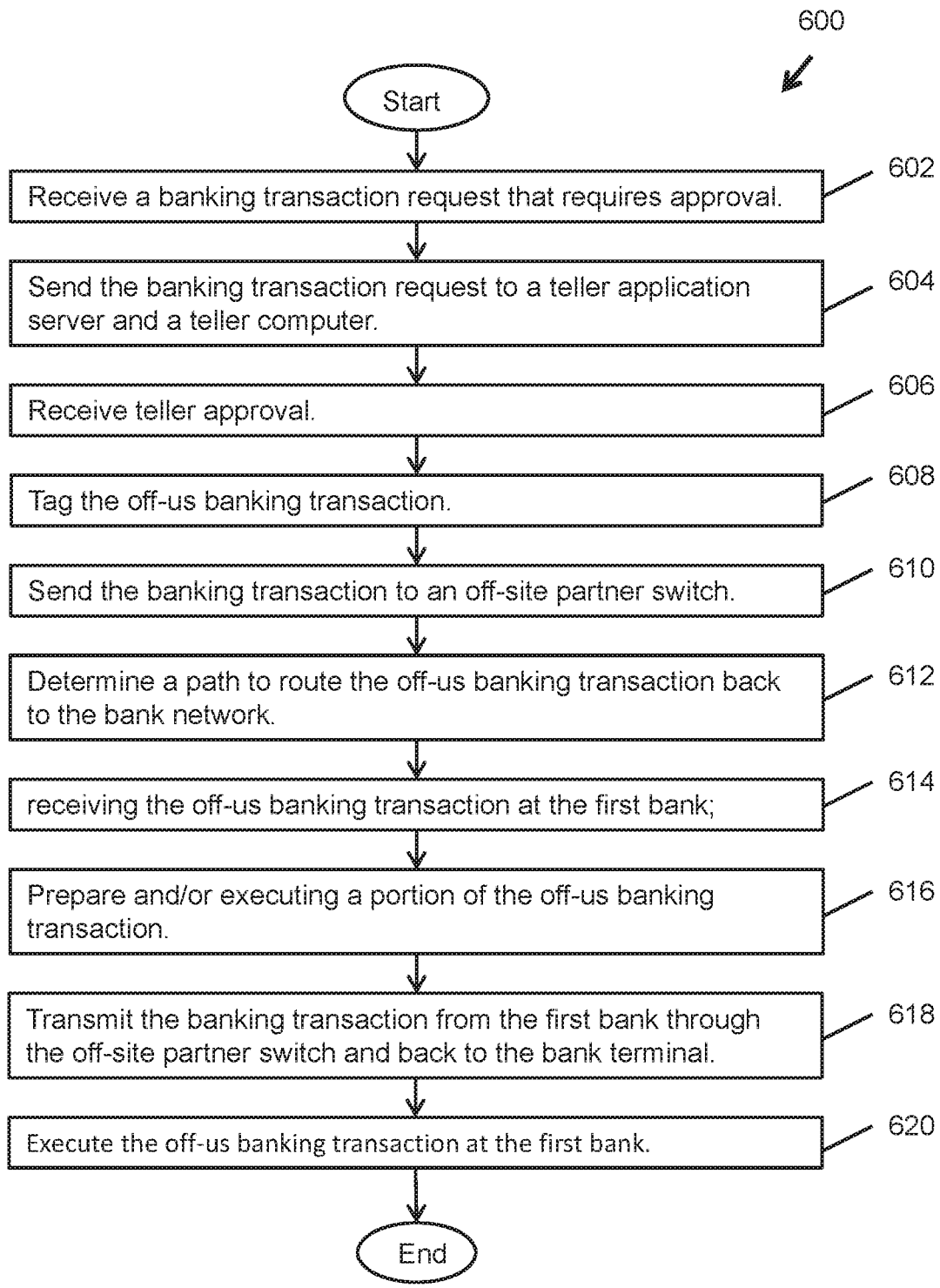
FIG. 6 is a simplified flow diagram of a process carried out in one or more embodiments of the present disclosure.

FIG. 6 is a simplified flow diagram of a method 600 according to one or more implementations of the present disclosure. It is noted that the flow diagrams of the present disclosure and the blocks within the flow diagrams schematically illustrate the architecture, functionality, and operation of possible implementations of systems, methods, and computer program products according to various embodiments of the present disclosure. In this regard, each block in the flow diagram or blocks with the flow diagram may represent a module, segment, or portion of code, which comprises one or more executable instructions for implementing the specified logical function(s). It will also be noted that each block of the blocks with the flow diagram and combinations of blocks in the blocks with the flow diagram may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

In method 600, an off-site partner switch, such as any of partner switches 11, 311, 411, or 511, re-routes an off-us banking transaction request, such as request 2, back into a secured internal bank network, such as secured internal bank network 12, that the banking transaction request originated from. At 602, a banking transaction request is received by the first bank from a user. The exemplary banking transaction request requires approval of a teller, but other banking transaction requests may not require approval of a teller.

With reference again to FIG. 1, 602 corresponds to the banking transaction request 2 received by the first bank 18 from the user 4. The banking transaction request 2 can be defined by a plurality of transaction details. By way of example and not limitation, the plurality of transaction details can include at least one of the group including a transaction amount, one or more bank accounts, a personal identification number, a current image of user, an image of a driver's license, and a bank routing number. As set forth in greater detail below, the ILT 3 receives the banking transaction request 2 and can be configured to transmit the banking transaction request 2 for eventual receipt, by the bank core 15, of at least some or all of the plurality of transaction details.

At 604 in FIG. 6, the banking transaction request is sent to the teller application server and a teller computer. With reference again to FIG. 1, 604 corresponds to the ILT 3 directing the banking transaction request 2 over the secured internal bank network 12 to the teller computing device. In FIG. 1, this communication is referenced at 20, 22 and the teller computing device is defined by the teller application server 7 operating the teller application 9 as well as the teller pc 5, which can be a tablet. With reference again to FIG. 3, 604 corresponds to the ILT 303 directing the banking transaction request over the secured internal bank network 312 to the teller computing device. In FIG. 3, this communication is referenced at 320, 322 and the teller computing device is defined by the teller application server 307 in combination the teller pc 305. Alternatively, the communication can be transmitted directly to the teller pc 305, as referenced by communication line 324.

At 606 in FIG. 6, the teller computing device receives an approval input corresponding to approval of the banking transaction request by the human teller. It is noted that prior to presenting the human teller a user interface to enter approval or deny approval, the teller computing device can access the bank core 15 over the secured internal bank network 12 so that the human teller can be presented with additional information before deciding whether or not to grant approval. For example, the user interface displayed to the human teller in order to enter approval or deny approval can display the amount of a desired withdrawal (one of the details defining the banking transaction request) and also display a current balance in the account against which the withdrawal will be applied (current balance and account number being other details defining the banking transaction request).

In one or more embodiments of the present disclosure, the teller terminal 5 allows a human bank teller 6 to approve user-entered banking transactions requests entered at more than one automated bank terminals. A second banking transaction request from a second banking customer can be received at a second automated bank terminal, wherein the second banking transaction request is defined by a second plurality of transaction details. The second automated bank terminal can direct the second banking transaction request over the secured internal bank network 12 to the tablet computer 5 of the human teller. The tablet computer can receive a second approval input corresponding to approval of the second banking transaction request, the second approval input entered by the human teller.

The approval input can be communicated back to the ILT 3 from the teller computing device. With reference again to FIG. 1, this communication is referenced at 22, 20. With reference again to FIG. 3, this communication is referenced at 322, 320 or at 324.

The exemplary ILT 3 does not send the banking transaction request 2 to the human bank teller when no approval is needed. By way of example and not limitation, if the banking transaction request 2 is a deposit including cash and/or a check the ILT 3 does not send the banking transaction request 2 to the human bank teller. Other examples of banking transaction requests that may not require approval include a withdrawal under a predetermined limit, a withdrawal under a predetermined limit in which the user request a particular combination of bills, or a payment of a bill. Such requests can be designated as an off-us transaction by the ILT 3 and directed to the partner switch 11 upon entry. Further, the ILT 3 can execute such a banking transaction request substantially contemporaneously with directing the banking transaction request to the partner switch 11. Substantially contemporaneously refers to the executing of the banking transaction request and the directing occur at generally the same time or occur sequentially. The automated bank terminal need not wait to execute the requested transaction for approval from the bank core if the details of the transaction do not require prior approval.

In one or more embodiments of the present disclosure, the teller application server 7 may tag the banking transaction request 2 as approved by the bank teller 6 with a tag that may include a record of which teller approved the banking transaction request 2, what action the teller approved, and/or what time and date the banking transaction request 2 was approved. When the teller approves the banking transaction request 2, systems according to one or more embodiments may assign a teller approval code that identifies the teller that approved the banking transaction. In other configurations, the teller application server 7 stores a name of an approving teller, an approval time and date, and/or an action taken by the approving teller.

At 608 in FIG. 6, responsive to the banking transaction request being approved or prior to transmission outside of the secure internal bank network, the banking transaction request is tagged as an off-us transaction by the ILT 3. The designation or tagging of the banking transaction request as off-us is irresponsive to the plurality of transaction details. For example, the banking transaction request may involve the cashing of a check against a first account maintained by the first bank by user with a second account maintained by the first bank, and the banking transaction request can nonetheless be tagged as off-us. This facilitates processing of the banking transaction request without significant modifications to legacy systems. Current teller platforms do not allow check cashing at a self-service device. The ILT of the present disclosure will allow a check deposit through the partner switch 11 to be seen as a proper credit/debit transaction to the correct accounts. This is done by using the account from the check and the account associated with the card from the person wanting to cash the check.

At 610 in FIG. 6, the banking transaction request is directed to an off-site partner switch. With reference again to FIG. 1, 610 corresponds to the ILT 3 directing the banking transaction request 2 to the partner switch 11, outside of the secured internal bank network 12. In FIGS. 1 and 2, this communication is referenced at 26. With reference again to FIG. 3, 610 corresponds to the ILT 303 directing the banking transaction request over the secured internal bank network 312 to the partner switch 311. In FIG. 3, this communication is referenced at 326. The ILT 303 can direct the banking transaction request to the partner switch 311 over an electronic funds transfer (EFT) network or an automated clearing house (ACH) network, which are outside of the secured internal bank network 12, 312. This can be accomplished with a secure VPN to the Partner switch, or other communications methods like cellular.

At 612 of FIG. 6, the partner switch determines a path to route the banking transaction request. In the exemplary embodiment of the present disclosure, the banking transaction request is directed back to the secure internal bank network. With reference again to FIG. 1, the communication after the determination at 612 corresponds to the communication line referenced at 28. With reference again to FIG. 2, the communication after the determination at 612 corresponds to the communication lines referenced at 28 and 30, as the communication is directed through the global bank switch 33. With reference again to FIG. 3, the communication after the determination at 612 corresponds to the communication line referenced at 328.

Prior to directing the banking transaction request back to the secure internal bank network, the partner switch 611 converts the banking transaction request to the force-post transaction. The force-post transaction is defined by at least some of the plurality of transaction details that defined the banking transaction request, such the amount of the transaction, the implicated account(s), the relevant PIN, etc. The details of the force-post transaction include the off-us designation that was assigned to the banking transaction request prior to its transmission to the partner switch. The conversion of the banking transaction request to a force-post transaction facilitates processing of the banking transaction request without significant modifications to legacy systems. Force Post messaging allows the partner switch 611 to "approve" the transaction. This format ensures the bank switch will accept the teller approved transaction. This allows a self service device like the ILT to do teller transactions without having to make expensive changes directly to the core and/or the teller platform.

At 614 of FIG. 6, the first bank receives the off-us, force-post banking transaction from the partner switch. As shown in the Figures of the various embodiments, the switch 13 or 113 is configured to receive the off-us, force-post banking transaction request from the respective partner switch 11 or 311 over communication paths 28, 28 and 30, or 328. The force-post transaction is defined by at least some of the plurality of transaction details that defined the banking transaction request, or all of the plurality of transaction details. As set forth above, the force-post transaction can also be defined by designation or tagging as an off-us transaction. The partner switch, 11 or 311, can communicate across networks distinct from the secured internal bank network, such EFT or ACH networks.

The local bank switch, 13 or 313, can transmit the off-us, force-post banking transaction request after receipt to the bank core 15 or 315 over the secured internal bank network 12 or 312. With reference again to FIGS. 1 and 2, the communication to the bank core 15 corresponds to the communication line referenced at 32. With reference again to FIG. 3, the communication to the bank core 315 corresponds to the communication line referenced at 332.

At 616 of FIG. 6, a portion of the off-us, force-post banking transaction request is processed in the bank core. The bank core can update the primary ledger of the account(s) implicated by the banking transaction request and direct a confirmation message to the switch over the secured internal bank network. The confirmation message corresponds to recordation of the off-us, force-post transaction in the bank core. A force-post transaction, generally, does not require an authorization and so the confirmation message is not an authorization of the banking transaction request. The confirmation message can be desirable to advise the user at the ILT that the banking transaction request has been recorded in the appropriate account(s).

At 618 of FIG. 6, after at least partially processing the off-us, force-post banking transaction request, the bank core transmits an "approved transaction request" or confirmation message back to the ILT. In some configurations, the confirmation message is directed along the same path taken by the banking transaction request. With reference again to FIG. 1, the bank core 15 can direct the confirmation message to the switch 13 as shown by communication line 34, the switch 13 can direct the confirmation message outside of the secured internal bank network 12 to the partner switch 11 as shown by communication line 36, and the automated bank terminal 3 can receive the confirmation message from outside of the secured internal bank network 12 as shown by communication line 38. With reference again to FIG. 2, the bank core 15 can direct the confirmation message to the switch 13 as shown by communication line 34, the switch 13 can direct the confirmation message outside of the secured internal bank network 12 to the global bank switch 33 as shown by communication line 40, the global bank switch 33 can direct the confirmation message to the partner switch 11 as shown by communication line 42, and the automated bank terminal 3 can receive the confirmation message from outside of the secured internal bank network 12 as shown by communication line 38. With reference again to FIG. 3, the bank core 315 can direct the confirmation message to the switch 313 as shown by communication line 334, the switch 313 can direct the confirmation message outside of the secured internal bank network 312 to the partner switch 311 as shown by communication line 336, and the automated bank terminal 303 can receive the confirmation message from outside of the secured internal bank network 312 as shown by communication line 338.

At 620 of FIG. 6, the ILT can execute the banking transaction request. The ILT may mechanically dispense from a cash dispensing portion of the ILT an amount of cash. The ILT 3 may be configured to dispense cash for a banking transaction request that includes a request for two different types of currency denominations.

It is noted that more than one bank may share the partner switch 11. It is also noted that the partner switch 11 may be owned by a third-party that may not be a single bank. This may be especially useful and cost effective for small banks with few branch offices because the partner switch eliminates the complexity of completely updating the software, message protocols, and/or other features of the first bank switch 13 to allow the first bank switch 13 to communicate with the ILT 3, as well as multiple ILTs. With a partner switch 11, the ILT 3 communicates directly with the partner switch 11 without the need of having the partner switch 11 or the ILT 3 needing to communicate with other legacy devices such as first bank switch 13 using legacy message formats, communication formats and protocols, and using legacy SW. Thus, the partner switch hardware can come with a connection to a network provider that will route on-us transactions back to the first bank core 15 with minimal or, in some cases, zero changes to in-house processing by the first bank.

In one or more embodiments of the present disclosure, the systems 1, 31, 301 of FIGS. 1-3 may be utilized to cash a check received at the respective ILT 3 or 303. With specific reference to FIG. 2, an exemplary banking transaction request for cash can be based on a presented check associated with a banking account maintained at the first bank 18 with payment directed to a person with a second account maintained at the second bank 19. The ILT 3 or the teller application server 7 can generate an authentication request message to request authentication of the person desiring to cash the check. The teller application server 7 sends the authentication request message to the switch 13 of the secured internal bank network 12. The switch 13 next sends the authentication request message to a global bank switch 33 that is external to the first bank 18 and a second bank 19. Next, the global bank switch 33 sends the authentication message to the second bank 19. The switch 13 of the first bank 18 receives an authentication response message that originated at the second bank 19 and is a response to the authentication request message. The authentication response message travels from the switch 13 to the ILT 3. Responsive to the authentication response message, the ILT 3 executes the request for cash by dispensing cash in an amount authorized on the presented check.

In one or more embodiments of the present disclosure, checks may be imaged by the ILT. Checks, deposits and the like may also be imaged when used to receive funds, deposit funds, or perform authentications. At the time of imaging, Magnetic Ink Character Recognition (MICR) lines on the check may be read by MICR strip readers and routing numbers may be determined from the check and/or captured image(s).

It can be desirable to verify an identity of the user. For example, the first bank, via the ILT and/or teller application server, can first attempt to verify an identity of the user with the records held by the first bank. One exemplary approach to verifying the user is by comparing a photograph of the user on a state-issued identification with a current image of the user. A camera located near the ILT can capture a first picture of the user. The ILT can then acquire a second picture of the user from a controlled source. For example, the controlled source may be a government-issued identification. The ILT may then verify the user by determining if the user is the person in the picture of the government-issued identification. Of course, other verifications can include verifying a signature of the user.

Figure 7:
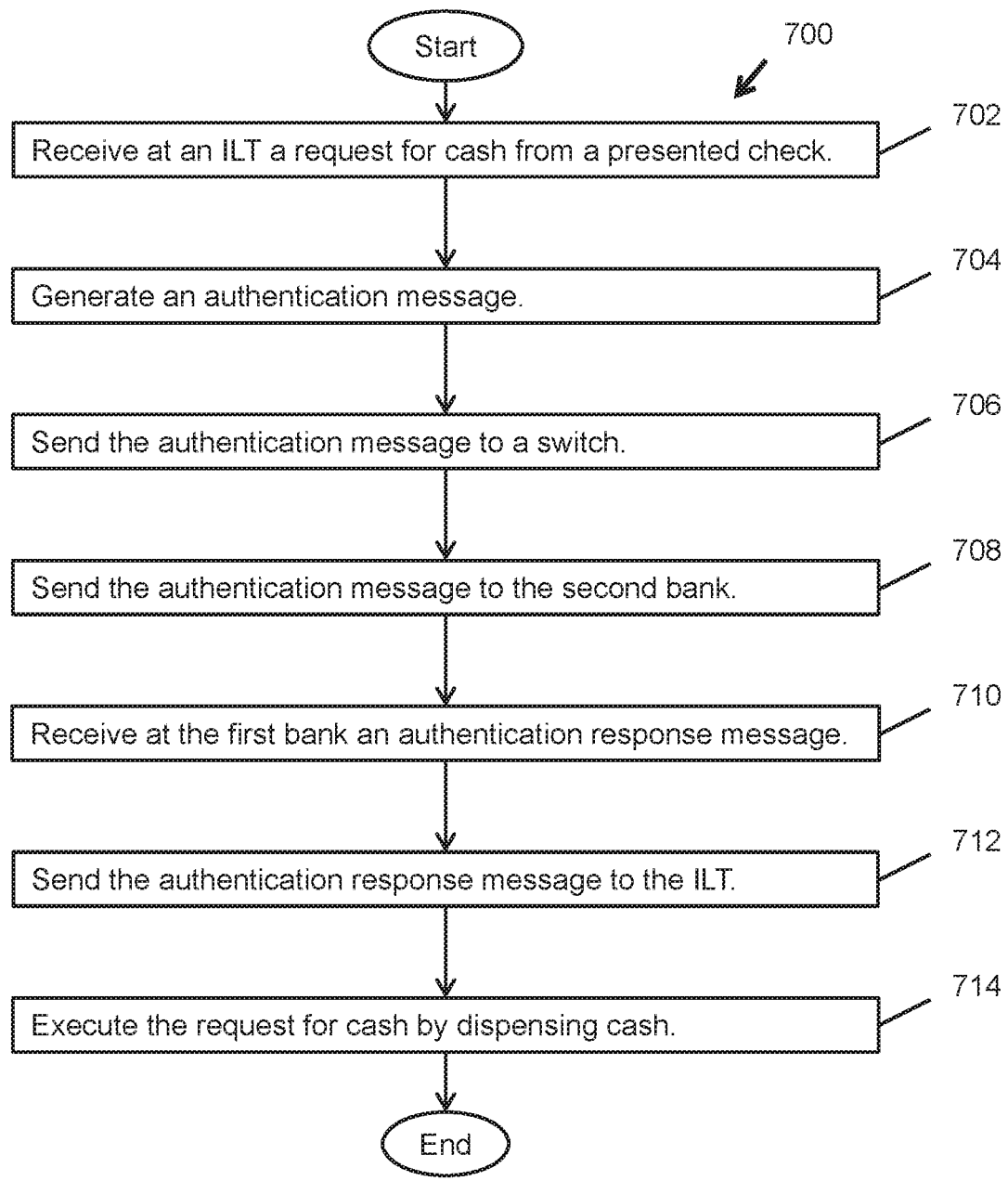
FIG. 7 is a simplified flow diagram of a process carried out in one or more embodiments of the present disclosure.

FIG. 7 illustrates an exemplary method 700 of authenticating a person cashing a check at a bank using a partner switch. At 702, an ILT of a first bank receives a request to cash a check. In this illustrative and non-limiting example, the check is drawn on an account maintained by the first bank and the user does not maintain an account at the first bank. At 704, in response to the request, an authentication message is generated. At 706, the authentication message is sent to the partner switch. At 708, the partner switch then directs the authentication message to a second bank, the bank that maintains an account associated with the user.

With reference again to FIG. 1, communication line 26 corresponds to 706 and communication line 44 corresponds to 708. With reference again to FIG. 2, communication line 26 corresponds to 706. Communication lines 28 and 46 correspond to 708, as the global bank switch 33 can direct the authentication message to the second bank 19. With reference again to FIG. 3, communication line 326 corresponds to 706 and communication line 344 corresponds to 708.

The second bank can respond to the authentication message with an authentication response message. At 710, the authentication response message is received at a core of the first bank. With reference again to FIG. 1, communication lines 48, 28, and 32 correspond to 710. With reference again to FIG. 2, communication lines 50, 30, and 32 correspond to 710. With reference again to FIG. 3, communication lines 348, 328, and 332 correspond to 710.

After the core performs any necessary operations related to the message, the authentication response message is sent to the ILT at 712. With reference again to FIG. 1, communication lines 34, 36, and 38 correspond to 712. With reference again to FIG. 2, communication lines 34, 40, 42, and 38 correspond to 712. With reference again to FIG. 3, communication lines 334, 336, and 338 correspond to 712. Responsive to the authentication response message, the banking transaction request of cashing a check is executed by the ILT at 714, by dispensing cash in an amount authorized on the presented check.

Figure 8:
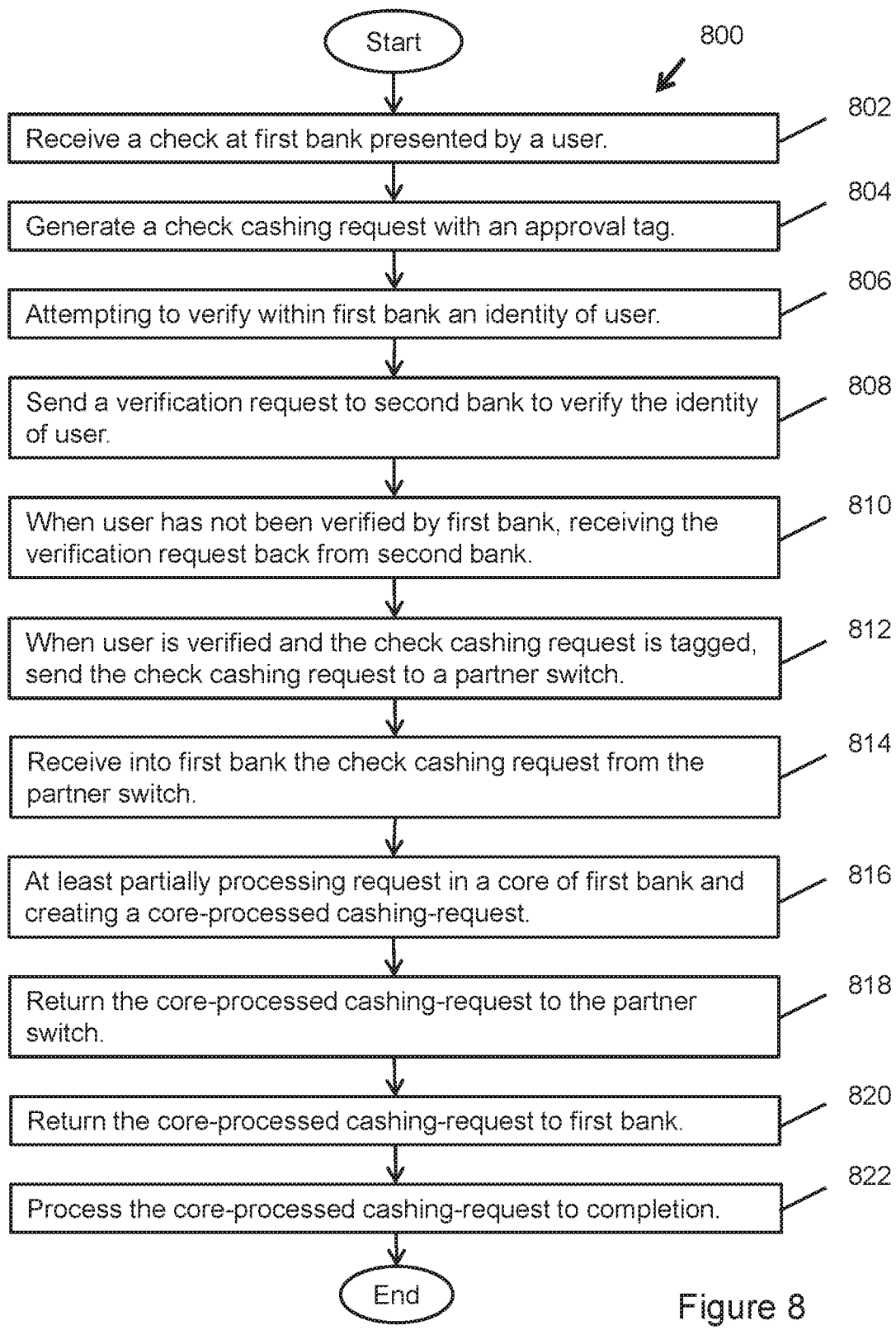
FIG. 8 is a simplified flow diagram of a process carried out in one or more embodiments of the present disclosure.

FIG. 8 illustrates an example method 800 of processing a check cashing request by verifying the presenter of a check at one of two banks. At 802, a check is presented at an ILT of a first bank by a user. In this illustrative and non-limiting example, the user has an account at a second bank but not at the first bank. The check is drawn on an account maintained by the first bank. A teller can generate a check cashing request with an approval tag indicating the check cashing request is teller approved at 804.

At 806, an attempt is made to verify the identity of the user within the first bank. This may be done by capturing a first picture of the user and comparing it to a second picture of the user that is recovered from a controlled source. The controlled source may be a government issued identification. When the user has not been verified by the first bank, a verification request is sent to the second bank at 808 to verify the identity of the user. A verification response is received by the first bank from the second bank at 810. When the user has been verified by one of the first and second banks, the ILT sends the check cashing request with the approval tag as an off-us request to the partner switch at 812. The check cashing request is received at the core of the first bank from the partner switch at 814. The core at least partially processes the check cashing request at 816, to create a core-processed cashing-request. The core-processed cashing-request is returned to the partner switch at 818. The core-processed cashing-request is returned to the ILT of the first bank at 820. The core-processed cashing-request is processed to completion by the ILT of the first bank by presenting funds to the user 822.

Figure 9:
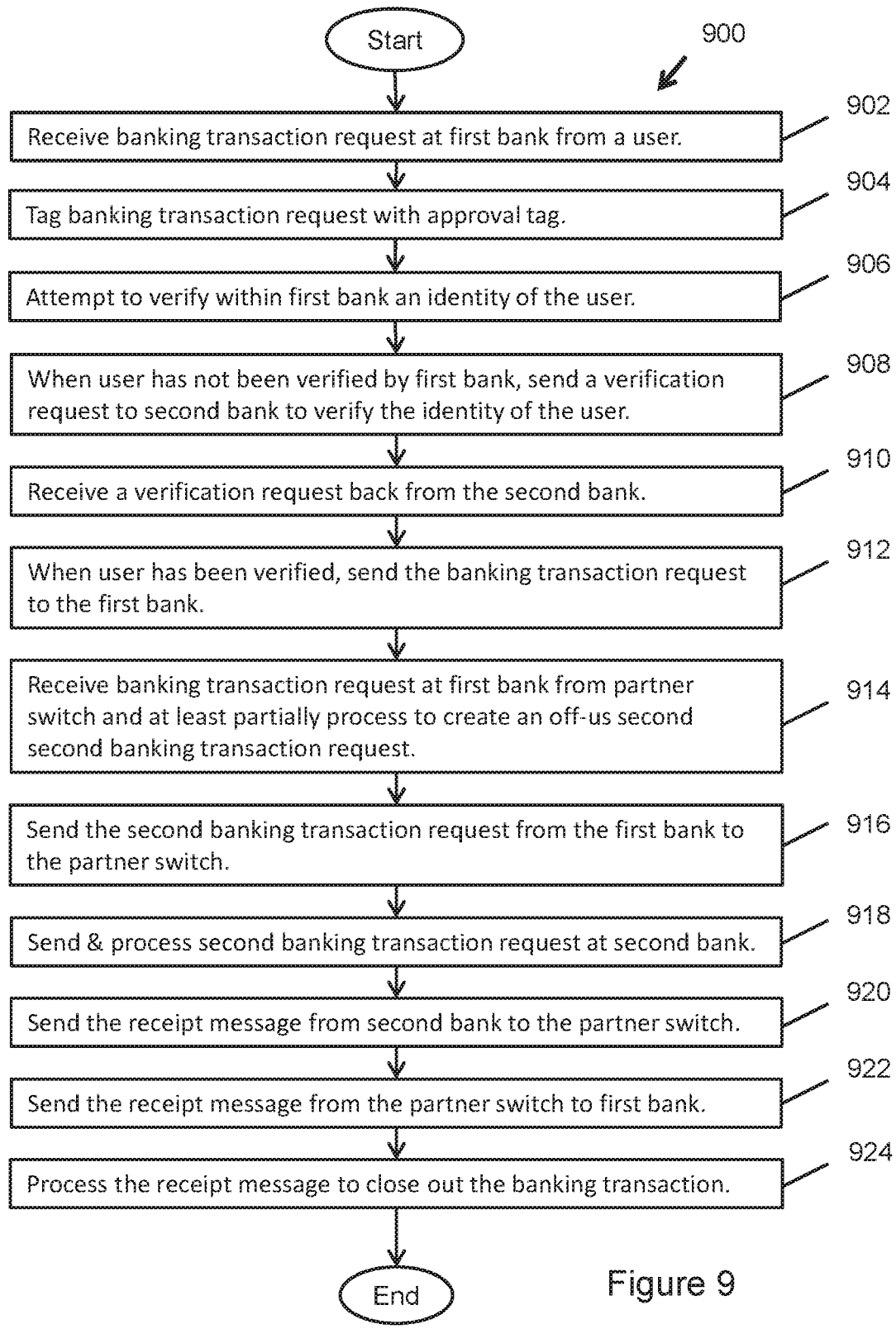
FIG. 9 is a simplified flow diagram of a process carried out in one or more embodiments of the present disclosure.

FIG. 9 is an example method 900 of processing a banking transaction that requires actions of two different banks to execute the transaction. At 902, an ILT of a first bank receives a banking transaction request. In this illustrative and non-limiting example, the check is presented by a user that has an account at a second bank but not at the first bank. A teller tags the banking transaction request with an approval tag at 904, indicating that the banking transaction request is teller-approved.

An attempt is made to verify an identity of the user within the first bank at 906. When the user has not been verified by the first bank, the core of the first bank sends a verification request to the second bank at 908, to verify the identity of the user. A verification response is received from the second bank at 910. When the user has been verified, the first transaction request with the approval tag is sent as an off-us request, at 912, from the partner switch to the first bank. Prior to 912, the banking transaction request was sent to the partner switch from the ILT.

The banking transaction request is received by the first bank from the partner switch and at least partially processed at 914 to create an off-us second banking transaction request. The off-us second banking transaction request is transmitted from the first bank to the partner switch at 916. The second banking transaction request is sent, at 918, to the second bank and, at least partially, processed at the second bank. The second banking transaction request is processed by accessing an account of the user to produce a receipt message at 920. The receipt message is sent from the second bank to the partner switch at 922. The receipt message is sent from the partner switch to the first bank at 924. The receipt message is processed, at 924, to close out the banking transaction.

Figure 10:
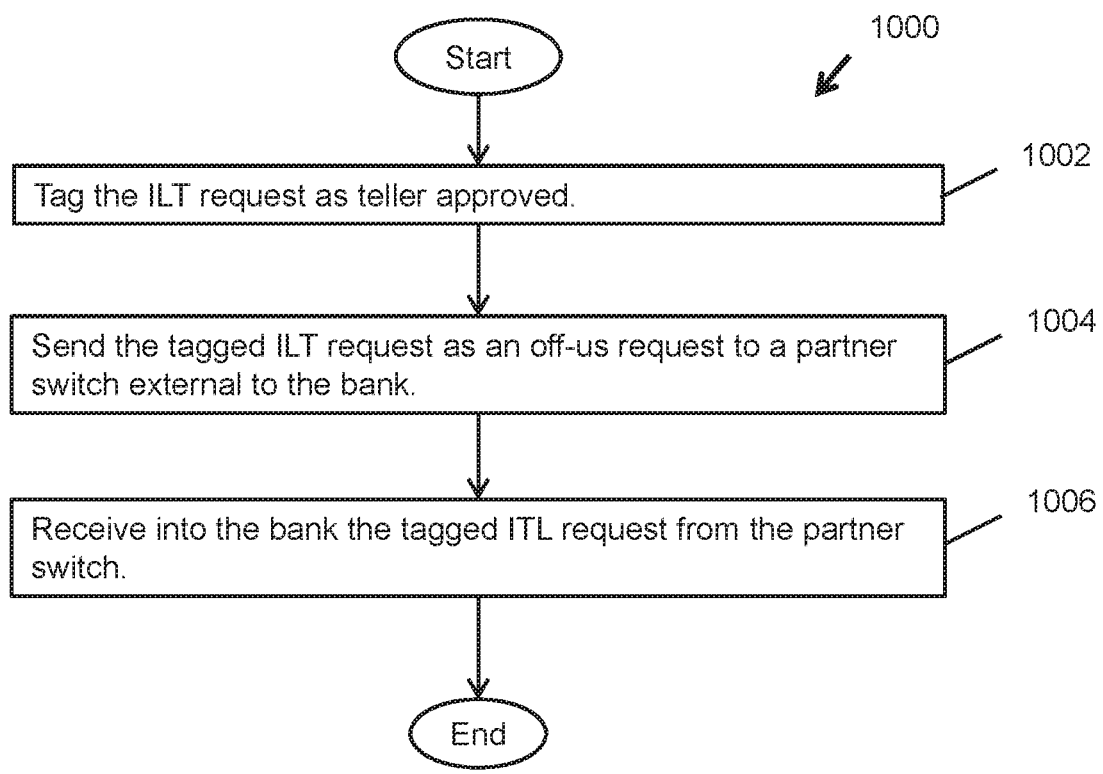
FIG. 10 is a simplified flow diagram of a process carried out in one or more embodiments of the present disclosure.

FIG. 10 illustrates a method of processing an ILT request at a partner switch. In this illustrative and non-limiting example, the method 1000 begins by tagging the ILT request as teller approved at a first bank at 1002, to create a tagged ILT request. The tagged ILT request is sent as an off-us request, at 1004, to a partner switch 11 external to the bank 18. The first bank receives the tagged ILT request from the partner switch at 1006. In one or more embodiments of the present disclosure, the tagged ILT request is received in a condition to process to completion at the first bank without requiring action by a second bank. In other embodiments, the ILT processes the request to completion.

Figure 11:
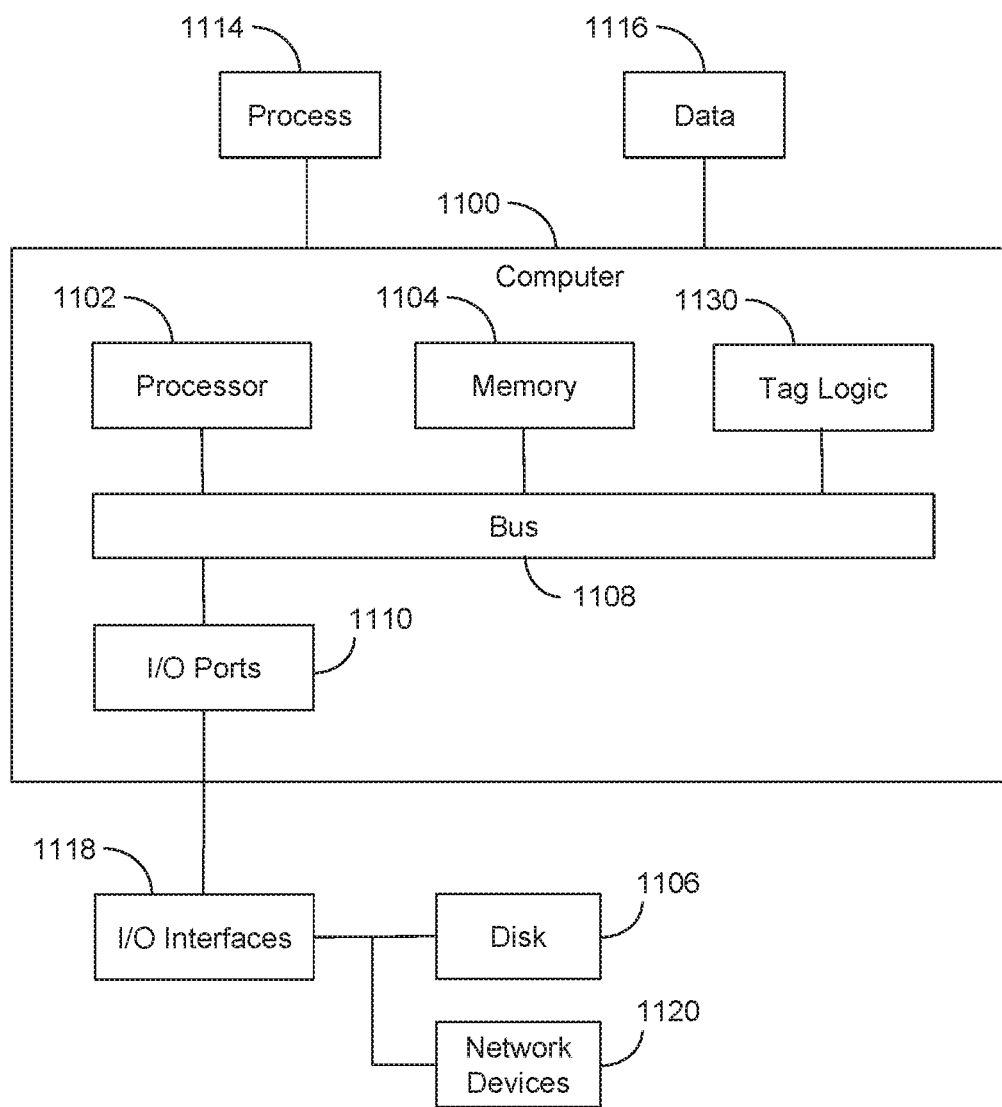
FIG. 11 is a schematic illustration of a teller computing device according to one or more embodiments of the present disclosure.

FIG. 11 illustrates an exemplary computing device which may be included in systems and methods described herein. The example computing device may be a computer 1100 that includes a processor 1102, a memory 1104, and input/output ports 1110 operably connected by a bus 1108. In one example, the computer 1100 may include a tag logic 1130 configured to allow a teller to tag (e.g., flag) a banking transaction request that the teller has approved. In different examples, tag logic 1130 may be implemented in hardware, software, firmware, and/or combinations thereof. Thus, the tag logic 1130 may provide means (e.g., hardware, software, firmware) for allowing a bank teller to tag transactions for approval and for a partner switch, as discussed above, to recognizes those tagged transactions and re-route them back into the bank that tagged those messages. While the tag logic 1130 is illustrated as a hardware component attached to bus 1108, it is to be appreciated that in one example, the tag logic 1130 could be implemented in the processor 1102.

Generally describing an example configuration of the computer 1100, the processor 1102 may be a variety of various processors including dual microprocessor and other multi-processor architectures. The memory 1104 can store a process 1114 and/or the data 1116, for example. The memory 1104 may include volatile memory and/or non-volatile memory. The non-volatile memory may include, for example, ROM, programmable read only memory (PROM), EPROM. The volatile memory may include, for example, RAM, synchronous random access memory (SRAM), dynamic random access memory (DRAM), synchronous dynamic random access memory (SDRAM), double data rate synchronous dynamic random access memory (DDR SDRAM), direct Rambus random access memory (DR-RAM) and the like.

A disk 1106 may be operably connected to the computer 1100 via, for example, an input/output interface (e.g., card, device) 1118 and the input/output port 1110. The disk 1106 may be, for example, a magnetic disk drive, a solid state disk drive, a floppy disk drive, a tape drive, a Zip drive, a flash memory card, and/or a memory stick. Furthermore, the disk 1106 may be a compact disc-ROM (CD-ROM), a compact disk (CD) recordable drive (CD-R drive), a CD rewriteable drive (CD-RW drive), and/or a digital video ROM drive (DVD ROM). The disk 1106 and/or the memory 1104 can store an operating system that controls and allocates resources of the computer 1100.

The bus 1108 may be a single internal bus interconnect architecture and/or other bus or mesh architectures. While a single bus is illustrated, it is to be appreciated that the computer 1100 may communicate with various devices, logics, and peripherals using other busses (e.g., PCIE, SATA, Infiniband, 1384, USB, Ethernet). The bus 1108 can be types including, for example, a memory bus, a memory controller, a peripheral bus, an external bus, a crossbar switch, and/or a local bus.

The computer 1100 may interact with input/output devices via the input/output interfaces 1118 and the input/output ports 1110. Input/output devices may be, for example, a keyboard, a microphone, a pointing and selection device, cameras, video cards, displays, the disk 1106, the network devices 1120, and so on. The input/output ports 1110 may include, for example, serial ports, parallel ports, universal-serial bus (USB) ports and the like.

The computer 1100 can operate in a network environment and thus may be connected to the network devices 1120 via the input/output interfaces 1118, and/or the input/output ports 1110. Through the network devices 1120, the computer 1100 may interact with a network. Through the network, the computer 1100 may be logically connected to remote computers. Networks with which the computer 1100 may interact include, but are not limited to, a local area network (LAN), a wide area network (WAN), and other networks. The networks may be wired and/or wireless networks.

Embodiments of the present disclosure can include apparatuses, methods, and computer program products. Accordingly, embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, embodiments may take the form of a computer program product embodied in any tangible medium of expression having computer-usable program code embodied in the medium. Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read only memory (EPROM) device, a portable compact disc read-only memory (CD ROM), an optical storage device, and a magnetic storage device. Computer program code for carrying out operations may be written in any combination of one or more programming languages.

"Processor" and "Logic", as used herein, includes but is not limited to hardware, firmware, software and/or combinations of each to perform a function(s) or an action(s), and/or to cause a function or action from another logic, method, and/or system. For example, based on a desired application or need, logic and/or processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

While the present disclosure has been set forth with reference to exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding or following the word is unimportant or unnecessary or "not critical" relative to anything else described in this document. The word "can" is used herein in a positive and affirming sense and no other motive should be presumed. More than one "invention" may be disclosed in the present disclosure; an "invention" is defined strictly by the content of a patent claim and not by what is written in a detailed description of an embodiment of an invention.

What is claimed is:

1. A method comprising:
arranging an automated bank terminal and a bank core both of a first bank in communication with one another over a secured internal bank network;
receiving, at the automated bank terminal, a banking transaction request from a user having an account with the first bank wherein the banking transaction request is thus an on-us transaction and is defined by a plurality of transaction details;
designating, with the automated bank terminal, the banking transaction request as an off-us transaction irresponsive to the banking transaction actually being an on-us transaction;
directing, with the automated bank terminal, the banking transaction request to a partner switch outside of the secured internal bank network in response to said receiving the banking transaction request and after said designating;
converting, with the partner switch, the banking transaction request received from the automated bank terminal and designated as off-us to a force-post transaction; and
directing, with the partner switch, the banking transaction request back into the secured internal bank network after said converting.

2. The method of claim 1 further comprising:
arranging a switch and the bank core in communication with one another over the secured internal bank network; and
receiving, with the switch, the banking transaction request in the form of the force-post transaction defined by at least some of the plurality of transaction details and originating at the partner switch after said directing the banking transaction to the partner switch.

3. The method of claim 2 wherein said receiving the banking transaction request in the form of the force-post transaction is further defined as:
receiving, with the switch, the banking transaction request in the form of the force-post transaction over one of an electronic funds transfer (EFT) network and an automated clearing house (ACH) network distinct from the secured internal bank network.

4. The method of claim 1 wherein said directing the banking transaction request to the partner switch is further defined as:
directing, with the automated bank terminal, the banking transaction request to the partner switch over one of an electronic funds transfer (EFT) network and an automated clearing house (ACH) network outside of the secured internal bank network.

5. The method of claim 1 wherein the plurality of transaction details include at least one of the group including a transaction amount, one or more bank accounts, a personal identification number, a current image of user, an image of a driver's license, and a bank routing number.

6. The method of claim 1 further comprising:
directing, with the automated bank terminal, the banking transaction request over the secured internal bank network to a teller computing device before said directing the banking transaction request to the partner switch; and
receiving, at the teller computing device, an approval input corresponding to approval of the banking transaction request before said directing the banking transaction request to the partner switch.

7. The method of claim 6 wherein said directing the banking transaction request to the teller computing device is further defined as:
   directing, with the automated bank terminal, the banking transaction request over a secured internal bank network to a teller computing device including a tablet computer.

8. The method of claim 7 further comprising:
   receiving, at a second automated bank terminal, a second banking transaction request from a second user wherein the second banking transaction request is defined by a second plurality of transaction details;
   directing, with the second automated bank terminal, the second banking transaction request over the secured internal bank network to the tablet computer;
   receiving, at the tablet computer, a second approval input corresponding to approval of the second banking transaction request; and
   directing, with the second automated bank terminal, the second banking transaction request to the partner switch.

9. The method of claim 6 further comprising:
   accessing, with the teller computing device, the bank core over the secured internal bank network prior to said receiving the approval input.

10. The method of claim 1 further comprising:
    executing, with the automated bank terminal, the banking transaction request substantially contemporaneously with said directing the banking transaction request to a partner switch outside of the secured internal bank network.

* * * * *